United States Patent
Alexander et al.

(10) Patent No.: US 10,752,047 B2
(45) Date of Patent: Aug. 25, 2020

(54) LACED WHEEL AND METHOD OF MANUFACTURE

(71) Applicant: Harley-Davidson Motor Company Group, LLC, Milwaukee, WI (US)

(72) Inventors: Derek Alexander, Nekoosa, WI (US); Russell Barnett, Pewaukee, WI (US)

(73) Assignee: Harley-Davidson Motor Company Group, LLC, Milwaukee, WI (US)

(*) Notice: Subject to any disclaimer, the term of this patent is extended or adjusted under 35 U.S.C. 154(b) by 152 days.

(21) Appl. No.: 15/675,158

(22) Filed: Aug. 11, 2017

(65) Prior Publication Data

US 2018/0056713 A1   Mar. 1, 2018

Related U.S. Application Data

(60) Provisional application No. 62/378,304, filed on Aug. 23, 2016.

(51) Int. Cl.
| | |
|---|---|
| B60B 27/00 | (2006.01) |
| B60B 1/04 | (2006.01) |
| B60B 31/00 | (2006.01) |
| B60B 21/06 | (2006.01) |

(52) U.S. Cl.
CPC ............ *B60B 1/044* (2013.01); *B60B 1/042* (2013.01); *B60B 1/043* (2013.01); *B60B 21/06* (2013.01); *B60B 31/005* (2013.01); *B60B 27/0047* (2013.01); *B60B 2310/202* (2013.01); *B60B 2320/12* (2013.01); *B60B 2320/122* (2013.01); *B60B 2320/124* (2013.01)

(58) Field of Classification Search
CPC ....... B60B 1/044; B60B 1/043; B60B 31/005; B60B 1/042; B60B 21/06; B60B 2320/12; B60B 2310/202; B60B 2320/122; B60B 2320/124; B60B 27/0047
See application file for complete search history.

(56) References Cited

U.S. PATENT DOCUMENTS

| | | | | |
|---|---|---|---|---|
| 4,019,782 | A | * | 4/1977 | Reppert .................. B60B 21/06 301/58 |
| 4,518,204 | A | * | 5/1985 | Takada .................... B60B 23/00 29/894.342 |
| 5,797,660 | A | | 8/1998 | Johnson |
| 6,145,936 | A | | 11/2000 | Alberti et al. |
| 6,257,677 | B1 | | 7/2001 | Chen |
| 6,375,273 | B2 | | 4/2002 | Pont |
| 6,474,746 | B2 | | 11/2002 | Campagnolo |
| 6,582,029 | B2 | | 6/2003 | Okajima |
| 6,767,069 | B2 | | 7/2004 | Chen |
| 7,597,404 | B2 | | 10/2009 | Fuse et al. |
| 7,874,625 | B2 | | 1/2011 | Addink |
| 8,313,155 | B2 | | 11/2012 | Schiers |

(Continued)

OTHER PUBLICATIONS

PACE Industries, Glossary of Terms, <https://paceind.com/die-casting-101/die-casting-faqs/glossary-of-terms/#f> webpage available as early as Aug. 31, 2016.

*Primary Examiner* — Rick K Chang
(74) *Attorney, Agent, or Firm* — Michael Best & Friedrich LLP

(57) ABSTRACT

A laced wheel manufactured from a one-piece casting, including both the hub portion and the rim portion. After casting and machining spoke interfaces, the hub and rim portions are separated and wire spokes are assembled.

10 Claims, 7 Drawing Sheets

(56) References Cited

U.S. PATENT DOCUMENTS

| | | | |
|---|---|---|---|
| 8,746,808 B2 | 6/2014 | Kuan et al. | |
| 9,067,465 B2 | 6/2015 | Erler et al. | |
| 9,346,319 B2 | 5/2016 | Schiers | |
| 9,409,440 B2 | 8/2016 | Hiramaru et al. | |
| 9,656,516 B2 | 5/2017 | Hall et al. | |
| 10,190,204 B2* | 1/2019 | Menzel | B05D 7/572 |
| 2001/0005098 A1 | 6/2001 | Pont | |
| 2004/0075334 A1 | 4/2004 | Chen | |
| 2005/0173090 A1* | 8/2005 | Ling | B22C 7/02 164/35 |
| 2005/0269867 A1 | 12/2005 | Fuse et al. | |
| 2006/0250021 A1 | 11/2006 | Hoeppner | |
| 2007/0035175 A1 | 2/2007 | Lin | |
| 2007/0200422 A1 | 8/2007 | Davis et al. | |
| 2010/0052411 A1 | 3/2010 | Addink | |
| 2010/0090518 A1 | 4/2010 | Schiers | |
| 2012/0205965 A1 | 8/2012 | Kuan et al. | |
| 2013/0056136 A1 | 3/2013 | Schiers | |
| 2013/0062927 A1 | 3/2013 | McAinsh | |
| 2013/0342003 A1 | 12/2013 | Meggiolan | |
| 2014/0145496 A1 | 5/2014 | Chang | |
| 2014/0346845 A1 | 11/2014 | Renner | |
| 2014/0361602 A1 | 12/2014 | Hiramaru et al. | |
| 2015/0360509 A1 | 12/2015 | Werner et al. | |
| 2015/0375564 A1 | 12/2015 | Satterthwaite et al. | |
| 2016/0263939 A1 | 9/2016 | Schiers | |

\* cited by examiner

LACED WHEEL AND METHOD OF MANUFACTURE

CROSS-REFERENCE TO RELATED APPLICATIONS

This application claims priority to U.S. Provisional Patent Application No. 62/378,304, filed Aug. 23, 2016, the entire content of which is incorporated herein by reference.

BACKGROUND

The present invention relates to vehicle wheels. In particular, the invention relates to laced wheels, such as those commonly used for motorcycles, in which the inner hub and the outer rim are separate members connected together by a plurality of individual wire spokes. Each wire spoke is connected to the outer rim with a spoke nipple that allows tension adjustment for truing the wheel. Although laced wheels are highly desirable by many consumers, their construction conventionally limits manufacturing options, and the individual wire spoke connections can loosen unevenly over time.

SUMMARY

In one aspect, a laced wheel includes a hub and a rim secured to the hub with a plurality of individual wire spokes. A method of manufacturing the laced wheel includes casting the hub and the rim integrally together with a temporary connecting arrangement, machining spoke interfaces to the hub and the rim, removing the temporary connecting arrangement to separate the rim from the hub, and connecting each of the plurality of individual wire spokes between the hub and the rim at the spoke interfaces.

In another aspect, a wheel casting for a wire laced wheel includes a hub portion having a circumferential array of spoke holes and a rim portion having a circumferential array of spoke holes.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
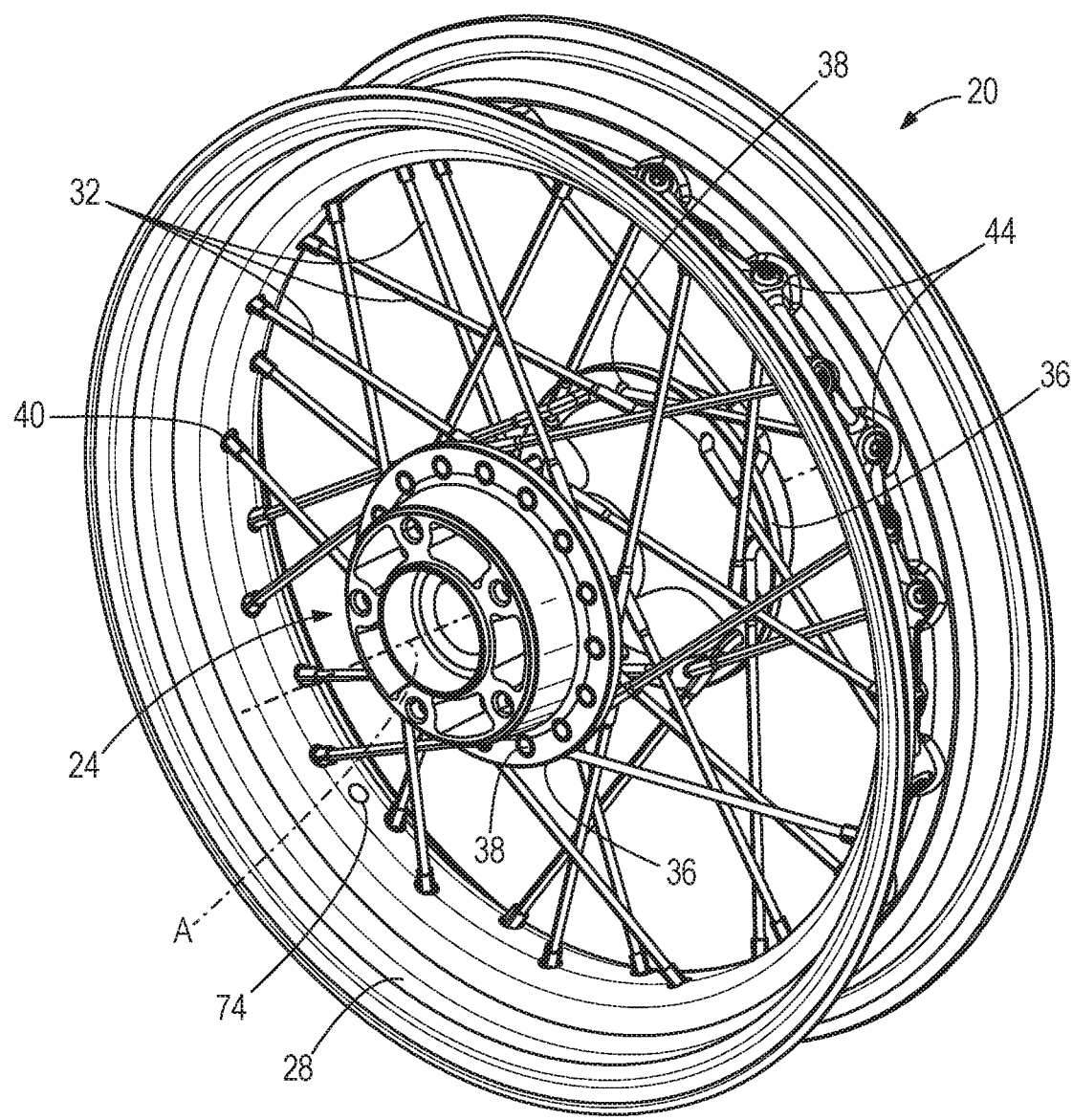
FIG. 1 is a perspective view of a laced wheel according to one aspect of the invention.
Figure 6:
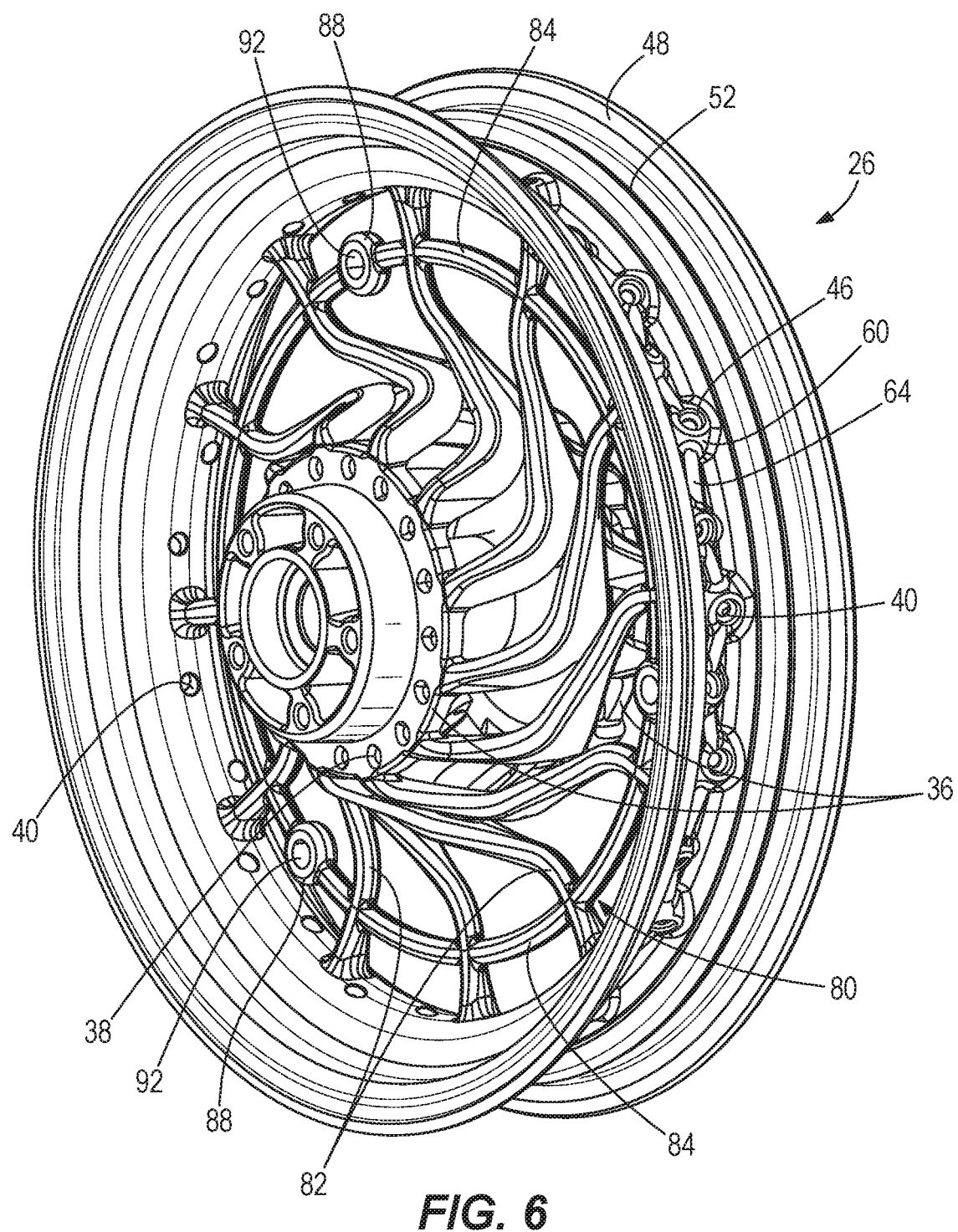
FIG. 6 is a perspective view of the initial casting of FIG. 4, machined with spoke holes.

FIG. 1 illustrates a laced wheel 20 constructed of a hub 24 lying at a relatively radially inner position, a rim 28 at a radially outer position, and a plurality of wire spokes 32, each of which extends between and connects to the hub 24 and the rim 28. The wheel 20 can define a central axis A, shared by the hub 24 and the rim 28. The wire spokes 32 can be arranged in a variety of patterns, including that shown, and the number of spokes 32 can be greater than 20, or greater than 30. The hub 24 can include axial end flanges 36 provided with mounting locations or interfaces (e.g., holes 38) for securing the radially inner ends of each of the spokes 32. The inner ends of the spokes 32 can be hooked ends. Likewise, the rim 28 can be provided with a plurality of mounting locations or interfaces (e.g., holes 40) for securing the radially outer ends of each of the spokes 32. A spoke nipple or fastener 44 can be provided at the radially outer end of each spoke 32. The nipple 44 extends radially inward into the corresponding hole 40, from the outside, into a seat 46 (FIG. 6) formed around the hole 40. Turning the nipple 44 in one direction tightens the corresponding spoke 32, while turning the nipple 44 in the opposite direction loosens the spoke 32. The nipples 44 are used for adjusting spoke tension at the time of assembly and during the course of maintenance for truing the wheel 20. The spokes 32 of the wheel 20 may be constructed of a material (e.g., steel wire) that is different from the hub 24 and the rim 28.

The hub 24 and the rim 28 are separate members, connected together only by the spokes 32. However, the hub 24 and the rim 28 are manufactured of one common material (e.g., aluminum). Further, the hub 24 and the rim 28 are formed in a common forming process as one monolithic element (e.g., a single casting) before being divided into separate elements as discussed in further detail below. Although constructed together of common material in a common forming process, the hub 24 and the rim 28 can have different finishes, applied post-casting, to provide a difference in appearance.

Figure 2:
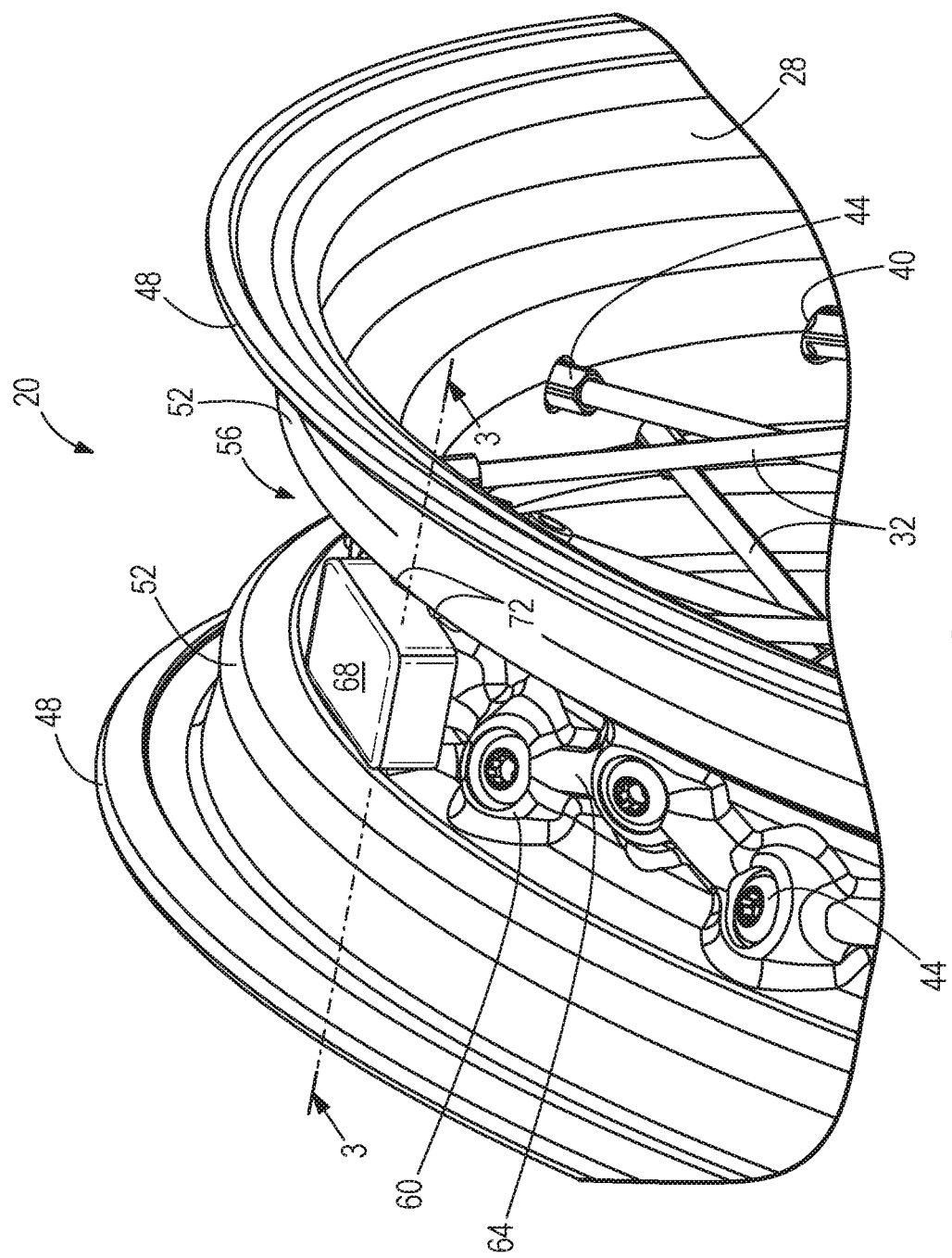
FIG. 2 is a detail perspective view of a portion of the laced wheel of FIG. 1, including a mounting feature for a tire pressure monitoring sensor.
Figure 3:
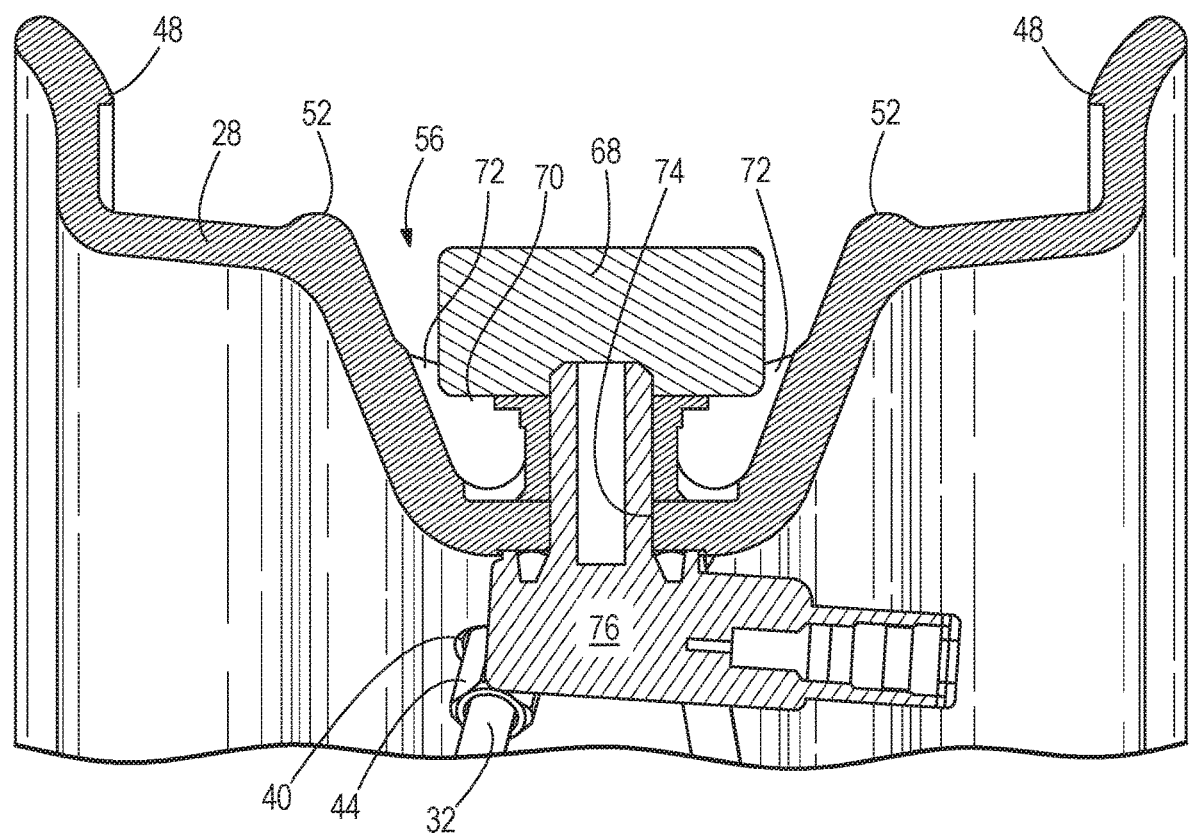
FIG. 3 is a cross-section of the laced wheel taken along line 3-3 of FIG. 2.

As best shown in FIGS. 2 and 3, the rim 28 includes axially opposed ends in a direction along the central axis A, each defining a bead seat 48 for engaging and retaining a tire bead. Axially interior of each bead seat 48 is a hump 52 that projects radially outward to limit movement of the tire bead during installation. Between the humps 52, a well 56 is defined at the axially central portion of the rim 28. The well 56 is radially closer to the central axis A than the bead seats 48 or the humps 52. The holes 40 for the spoke nipples 44 are provided in the well 56. Along the circumferential direction, the holes 40 can be arranged in a zigzag pattern, such that each adjacent hole 40 is offset to one axial direction or the other in an alternating pattern. In other embodiments, the holes 40 can be formed outside of the well 56 (e.g., in a portion of the rim 28 axially outside of the bead seats 48). Around each hole 40, a raised mound 60 is formed, and between each adjacent hole 40 is a raised rib 64, connecting the raised mounds 60. The raised features 60, 64 are cast into a radially outer surface of the rim 28 and are of a form that is circumferentially non-uniform and impossible to achieve with an extrusion process. The raised features 60, 64 allow for distribution of force loads (e.g., braking loads, engine torque loads, dynamic vehicle loads, etc.) transferred into the rim 28 through the spokes 32 and the hub 24. Similarly, a designated mount for a tire pressure monitoring sensor 68 can be cast into the rim 28 as shown in FIGS. 2 and 3. The mount can be defined at least in part by any of: a pocket or recess 70, and any number of projections or tabs 72 so as to maintain the tire pressure monitoring sensor 68 at a desired location. Some or all of the features forming the mount can be of a form that is circumferentially non-uniform and impossible to achieve with an extrusion process. In the case of the tire pressure monitoring sensor mount, the feature(s) are formed simultaneously in a casting die or mold at the time of forming the rim 28, and the sensor mount is provided only at a single circumferential location on the rim. As shown in FIG. 3, the feature(s) forming the mount for the tire pressure monitoring sensor 68 are provided in the outer radial surface of the rim 28 at a location of a valve stem aperture 74 that receives a valve stem 76 for inflating a tire mounted on the wheel 20. In some embodiments, a rim seal can be coupled to the outer radial surface of the rim 28 (e.g., coupled within the well 56) to provide an air seal between the outer radial surface and the inner radial surface of the rim 28 (e.g., air is inhibited from traveling through the holes 40 and the valve stem aperture 74) as described in U.S. Pat. No. 9,067,465, the contents of which is incorporated herein by reference.

Figure 4:
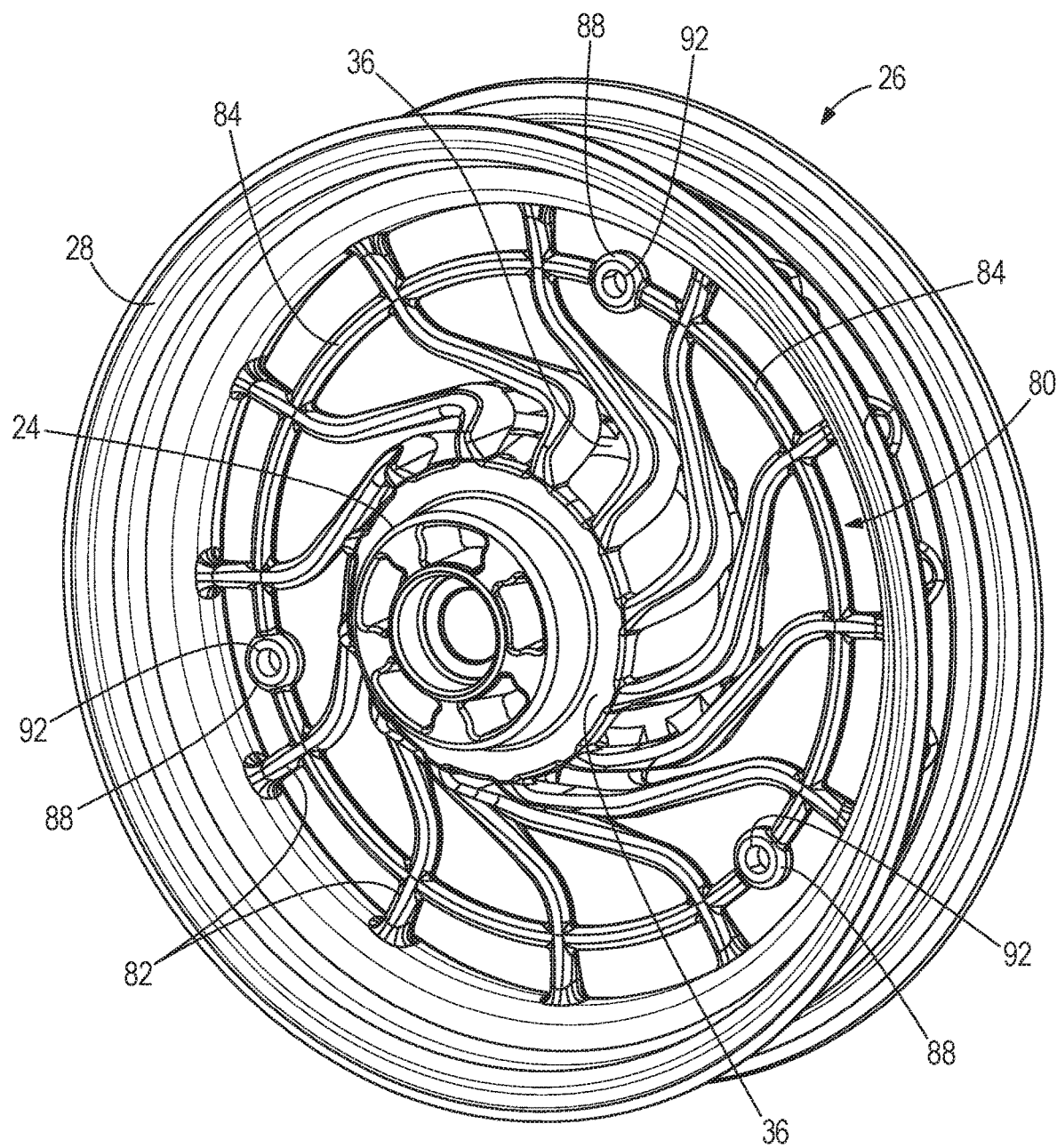
FIG. 4 is a perspective view of an initial casting for the laced wheel of FIG. 1, including a temporary connecting arrangement.

The hub 24 and the rim 28 are cast together as one piece, referred to herein as the initial casting 26 (FIGS. 4 and 6), and the initial casting 26, while in a single piece, is machined complete with features, (i.e., inner and outer spoke interfaces) for lacing. The initial casting 26 includes a connecting arrangement 80 that is integrally formed by casting to connect the hub 24 and the rim 28 (FIG. 4). The connecting arrangement 80 can be formed with multiple spoke 82 that can be split at the radially inner end to connect to both axial end flanges 36 of the hub 24. The connecting arrangement 80 includes a brace ring 84 having mounting features 88 with each mounting feature 88 defining a mounting aperture 92. The illustrated brace ring 84 is positioned radially between the hub 24 and the rim 28 and provides structural rigidity to the connecting arrangement 80. The connecting arrangement 80 is a temporary provision to allow machining of spoke-retaining features, such as the holes 40 (FIG. 6), while the hub 24 and the rim 28 are united as an integral, monolithic component, described in more detail below. The temporary connecting arrangement 80 is then removed (FIG. 7) so that hub 24 and the rim 28 are separate components, and the final wire spokes 32 can be assembled to re-join the hub 24 and the rim 28.

Figure 5:
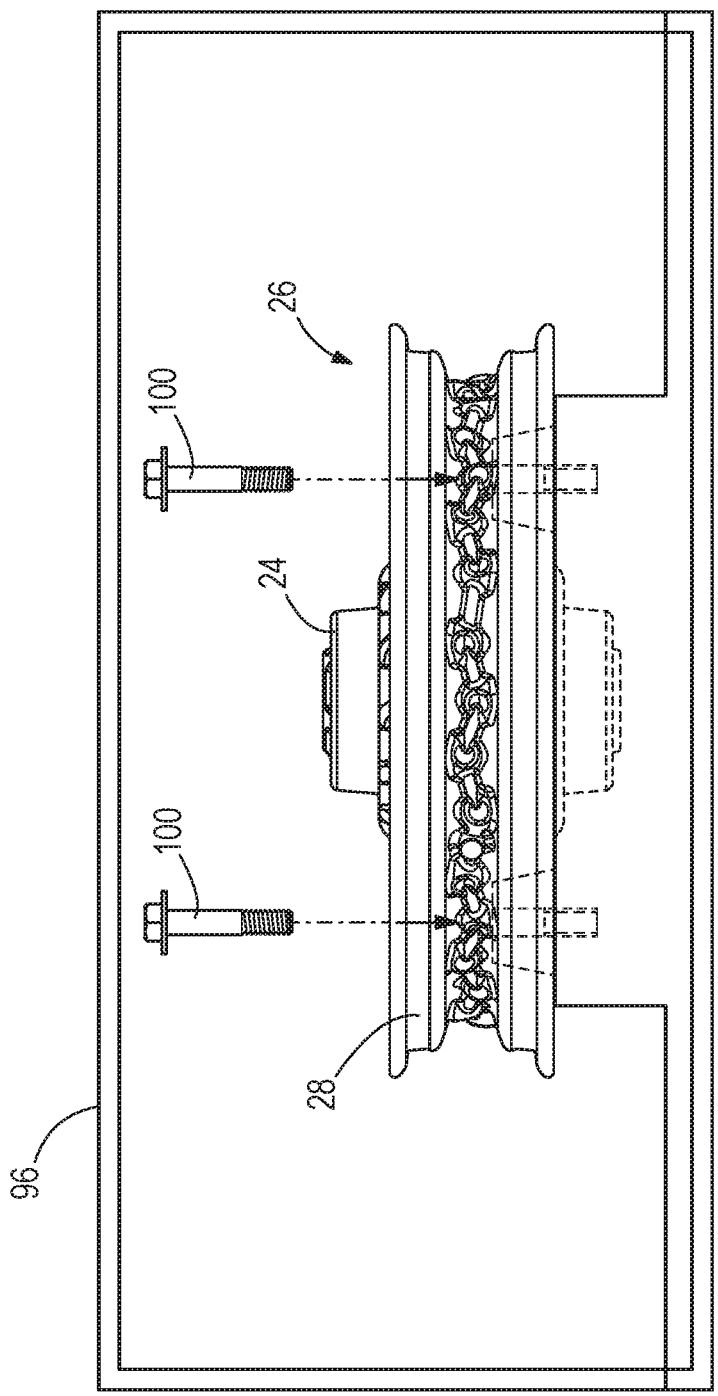
FIG. 5 illustrates the initial casting of FIG. 4 coupled to a machining center by the temporary connecting arrangement.

The initial casting 26 can be heat treated as a unit, including the hub 24 and the rim 28. The initial casting 26 can have a finish applied (e.g., paint or anodizing) according to the final finishing requirements for the hub 24 and the rim 28. Portions of the initial casting 26 are machined after casting to provide the spoke interfaces on the hub 24 and the rim 28, as the initial casting 26 is not cast with the respective holes 38, 40. Additional machining of the initial casting 26 can include machining of the bead seat 48, the hump 52, hub bearing bores, brake rotor interfaces, etc. In some constructions, all of the machining (i.e., metal removal) that is performed to complete the wheel 20 (or a majority thereof) is performed on the hub 24 and the rim 28 while connected to each other via the temporary connecting arrangement 80 (FIG. 4), and in some cases is performed in a single machining center 96 (i.e., a multi-purpose CNC machine; FIG. 5). For example, the initial casting 26 is fixed to the single machining center 96 by securing the hub 24 and the rim 28 to the single machining center 96 (e.g., at least one fixture is coupled to the hub 24 and at least one fixture is coupled to the rim 28 to fix the initial casting 26 to the single machining center 96). The temporary connecting arrangement 80 is also fixed to the single machining center 96 by inserting fasteners 100 through the mounting apertures 92 (FIG. 5). The initial casting 26 can be maintained in a single fixture within a single machine while the spoke holes 38, 40 are machined, along with the additional machining described herein. Because the machining of the hub 24 and the rim 28 are centralized into the process of machining on a single component (i.e., the initial casting 26) rather than two separate components, tolerances can be maintained within that one component, and the tolerances can be limited to those of the machining center when all of the machining takes place in a single machining center. Typically, laced wheel rims are extruded aluminum, the extrusion is rolled, the holes are pierced, the rolled rim is welded, and a secondary finish is applied. There is typically no secondary processing of the spoke holes or bead and hump diameters in a machining center, so tolerances are determined by the quality of the process of rolling and welding of the rims and piercing the spoke holes, and these tolerances can be quite large which leads to greater product variability. By casting the hub 24 and the rim 28 of the wheel 20 together and, while still integrated, machining all of the interfaces to the spoke nipples and machining the bead and hump diameters, the tolerances of these features can be quite small in comparison to the traditional extruded processed rim. The tolerances of the hub 24 and the rim 28 when the wheel 20 is assembled is based on machining center tolerances and the machined features and virtual centerlines are relative to the tolerances of the machining center and these tolerances can be significantly tighter than traditional methods of rim manufacture therefore reducing product variability significantly.

Figure 7:
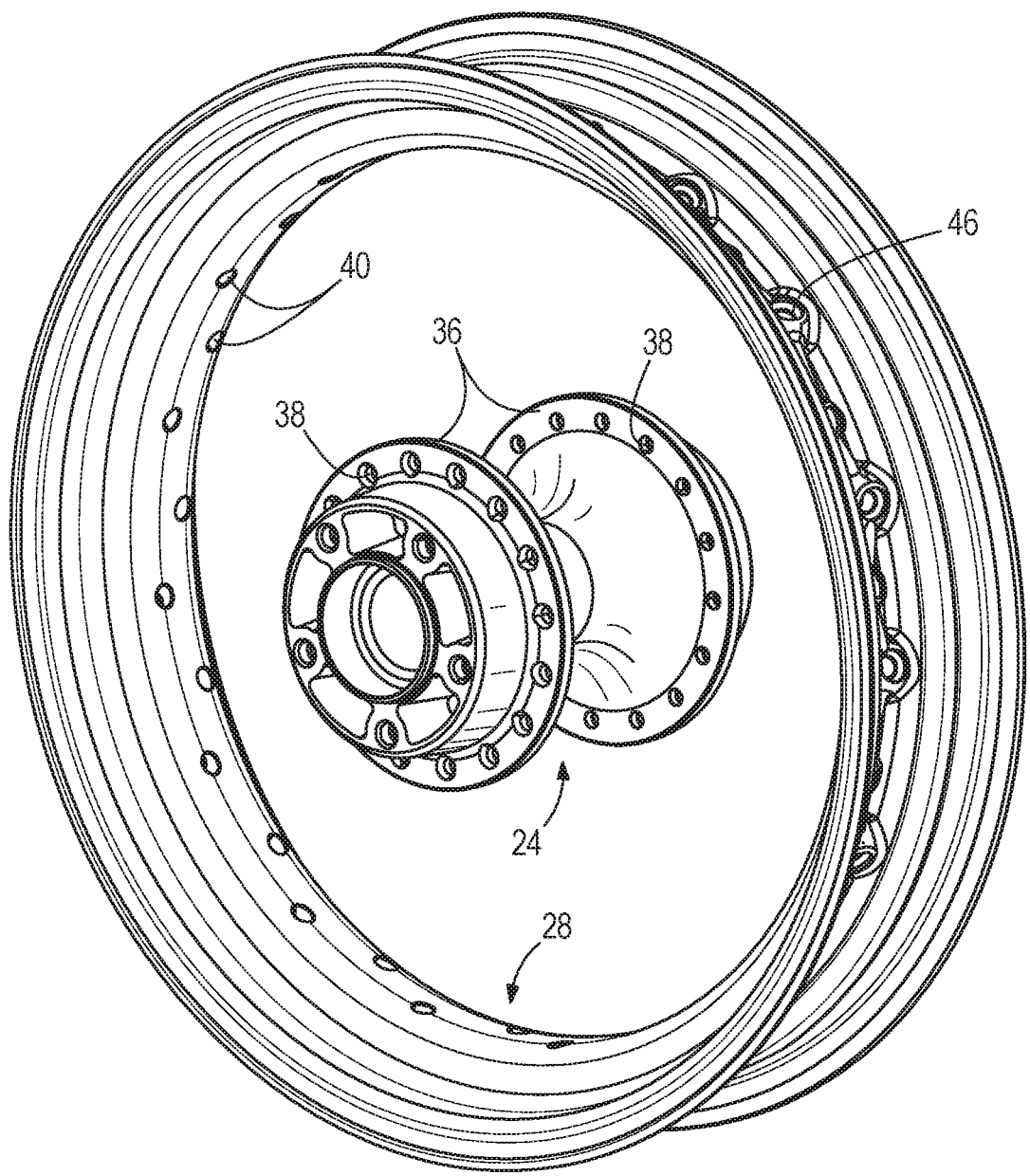
FIG. 7 is a perspective view showing the initial casting of FIG. 6, after removal of the temporary connecting arrangement to separate the hub and rim portions.

The last operation of the machining center 96 is to machine the temporary connecting arrangement 80 away from the hub 24 and the rim 28 so that the hub 24 and the rim 28 become two separate components as shown in FIG. 7. In particular, the temporary connecting arrangement 80 is fixed to the single machining center 96 by the fasteners 100 as the hub 24 and the rim 28 are machined from the temporary connecting arrangement 80. As such, all of the spokes 82 of the temporary connecting arrangement 80 remain coupled to each other by the brace ring 84 as each spoke 82 is machined off of the hub 24 and the rim 28. Once separation is complete, the hub 24 and/or the rim 28 can optionally continue to one or more secondary finishing operations depending on the final finishing requirements for the wheel 20. The hub 24 and the rim 28 are then assembled with the spokes 32 and the nipples 44, and the wheel 20 is trued on a truing stand by adjusting spoke tension with the nipples 44 so that the hub 24 and the rim 28 share the same central axis A. On the truing stand, the axial offset between the hub 24 and the rim 28 may also be adjusted. This post-assembly processing may be referred to as setting the radial and lateral runout of the wheel 20. The wheel 20 is then a finished component ready for tire mounting and assembly onto a vehicle, such as a motorcycle.

The manufacturing process flow for the wheel 20 can include the following operations, which in some constructions are carried out in the sequence as listed:
    Cast wheel as initial casting with rim, temporary connecting arrangement, and hub as one piece
    Heat treat initial casting to specification Option to apply wheel final finish at this point in the process, hub, rim and spokes (will leave bare aluminum after machining which is sometimes desirable)

Temporarily fasten initial casting to machining center by the temporary connecting arrangement Machine wheel geometry complete as needed for a laced wheel Remove temporary connecting arrangement to separate rim and hub Option to apply wheel final finish at this point to hub and/or rim (e.g., paint or chrome plated complete, or anodized)

Components are ready for final assembly

The lacing (i.e., installation of the spokes 32) and the truing of the wheel 20 can be easier than a traditionally-manufactured laced wheel by virtue of having better control of tolerances and features via a machining center. Further, the interface coefficient of friction between spoke nipples 44 and the rim 28 can be more consistently controlled with machined spoke interfaces, such as the seats 46 for the nipples 44. With better control of the coefficient of friction, true spoke tension can be better controlled. With better control on spoke tension, truing is more consistent and cycle time to produce a finished wheel 20 decreases significantly. With better control on tension and ease of truing, spoke failures in the field are reduced and the need for adjustment of spokes in the field is lessened because more spokes share a more equal load due to better control of tension as a result of better control on the coefficient of friction at the nipple-to-rim interface.

By manufacturing the rim 28 of the laced wheel 20 as a casting and not an extrusion, this opens the availability to include a wide array of cast-in features. Cast-in features can help distribute the strain in the rim of lacing pretension load and the load in service. Extruded rims typically only have the ability to adjust the thickness of the extrusion in order to reduce strains, which can become a performance and cost concern. Manufacturing as disclosed herein allows optimization of the rim's weight and spin inertia which can enhance vehicle performance and at a reduced cost in comparison. Cast-in features along with any final finishing options used on typical one piece cast wheel finishes can be used to enhance the style and/or function of the finished laced wheel assembly. For example, the wheel 20 can include contrasting portions of any two or more of: chrome, machined cuts, anodizing, mirror chrome highlighting and as-cast chrome highlighting.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

What is claimed is:

1. A method of manufacturing a laced wheel including a hub and a rim secured to the hub with a plurality of individual wire spokes, the method comprising:
    casting the hub and the rim integrally together with a temporary connecting arrangement, the temporary connecting arrangement including a plurality of spokes that connect at their radially inner ends to a first axial flange of the hub and a second axial flange of the hub;
    machining spoke interfaces to the hub and the rim;
    removing the temporary connecting arrangement to separate the rim from the hub; and
    connecting each of the plurality of individual wire spokes between the hub and the rim at the spoke interfaces.

2. The method of claim 1, wherein machining the spoke interfaces to the hub and the rim includes machining respective spoke holes in the hub and the rim in a common machining center.

3. The method of claim 2, further comprising machining nipple seats in a radially outer surface of the rim in the machining center with each nipple seat surrounding one spoke hole of the rim.

4. The method of claim 3, wherein connecting each of the plurality of individual wire spokes further includes connecting each of the plurality of individual wire spokes to the rim by a nipple at least partially positioned within one of the nipple seats.

5. The method of claim 2, further comprising temporarily fastening the hub and the rim to the common machining center by the temporary connecting arrangement before machining the spoke interfaces to the hub and the rim.

6. The method of claim 1, wherein casting the hub and the rim integrally together with the temporary connecting arrangement further includes casting a recess configured to receive a tire pressure sensor within a radially outer surface of the rim.

7. The method of claim 1, wherein casting the hub and the rim integrally together with the temporary connecting arrangement further includes casting a plurality of raised ribs on a radially outer surface of the rim.

8. The method of claim 1, further comprising machining nipple seats in a radially outer surface of the rim.

9. The method of claim 1, further comprising applying a finish to the hub and to the rim while connected with the temporary connecting arrangement.

10. The method of claim 1, further comprising applying a finish to at least one of the hub and the rim after removal of the temporary connecting arrangement.

* * * * *